US012003037B2

(12) United States Patent
Li et al.

(10) Patent No.: US 12,003,037 B2
(45) Date of Patent: Jun. 4, 2024

(54) BASE STATION ANTENNA AND PHASE-SHIFTING AND FEEDING DEVICE THEREOF

(71) Applicant: Comba Telecom Technology (Guangzhou) Limited, Guangzhou (CN)

(72) Inventors: Mingchao Li, Guangzhou (CN); Guosheng Su, Guangzhou (CN); Gengfei Wu, Guangzhou (CN)

(73) Assignee: Comba Telecom Technology (Guangzhou) Limited, Guangzhou (CN)

( * ) Notice: Subject to any disclaimer, the term of this patent is extended or adjusted under 35 U.S.C. 154(b) by 379 days.

(21) Appl. No.: 17/426,837

(22) PCT Filed: Nov. 4, 2019

(86) PCT No.: PCT/CN2019/115384
§ 371 (c)(1),
(2) Date: Jul. 29, 2021

(87) PCT Pub. No.: WO2020/155724
PCT Pub. Date: Aug. 6, 2020

(65) Prior Publication Data

US 2022/0123467 A1 Apr. 21, 2022

(30) Foreign Application Priority Data

Jan. 30, 2019 (CN) ......................... 201910090089.8

(51) Int. Cl.
*H01Q 3/36* (2006.01)
*H01Q 1/48* (2006.01)
*H01Q 1/50* (2006.01)

(52) U.S. Cl.
CPC ................. *H01Q 3/36* (2013.01); *H01Q 1/48* (2013.01); *H01Q 1/50* (2013.01)

(58) Field of Classification Search
None
See application file for complete search history.

(56) References Cited

U.S. PATENT DOCUMENTS 8,542,152 B2 * 9/2013 Yu ........................ H01Q 9/0471 343/702
8,570,223 B2 * 10/2013 Arslan ..................... H01Q 3/30 343/876
(Continued)

FOREIGN PATENT DOCUMENTS

CN 106972223 A 7/2017
CN 107819198 A 3/2018
(Continued)

OTHER PUBLICATIONS

International Search Report for Application No. PCT/CN2019/115384 dated Feb. 12, 2020, 4 pages.
(Continued)

*Primary Examiner* — Kenneth B Wells
(74) *Attorney, Agent, or Firm* — Seyfarth Shaw LLP

(57) ABSTRACT

The present invention relates to a phase-shifting and feeding device, comprising a metal cavity, a phase-shifting circuit, and a feeding network board. The metal cavity is a U-shaped groove structure and engages with a ground plane to form a shielding cavity, thereby having the effect of the cavity in a conventional phase shifter. Since the ground plane serves as a sidewall of the shielding cavity, one sidewall is omitted from the metal cavity relative to the cavity of a conventional phase shifter, thereby significantly reducing the thickness and weight of the metal cavity while ensuring the functions of the phase-shifting and feeding device. In addition, the metal cavity and the feeding network board are arranged to
(Continued)

be jointly grounded, while a signal terminal is electrically connected to a feeding circuit. Therefore, the feeding circuit may feed the phase-shifting circuit without using a co-axial feeder. Therefore, the described phase-shifting and feeding device has a reduced volume and a simplified structure, thereby facilitating the miniaturization of a base station antenna. In addition, further provided by the present invention is a base station antenna.

18 Claims, 6 Drawing Sheets

(56) References Cited

U.S. PATENT DOCUMENTS

| | | | | |
|---|---|---|---|---|
| 8,907,744 | B2 * | 12/2014 | Moon | H01P 1/184 333/128 |
| 9,065,175 | B2 * | 6/2015 | Corbin | H01Q 1/243 |
| 9,325,043 | B2 * | 4/2016 | Katipally | H01P 1/184 |
| 9,722,306 | B2 * | 8/2017 | Sø | H01Q 1/24 |
| 10,199,702 | B2 * | 2/2019 | Liao | H01Q 9/0485 |
| 10,224,602 | B2 * | 3/2019 | Azad | H01Q 1/243 |
| 10,411,346 | B2 * | 9/2019 | Xu | H01Q 3/32 |
| 10,498,028 | B2 * | 12/2019 | Xiao | H01Q 3/36 |
| 10,965,030 | B2 * | 3/2021 | Han | H01Q 1/243 |
| 11,133,595 | B2 * | 9/2021 | Park | H01Q 1/243 |
| 2003/0016097 | A1 | 1/2003 | McKinzie | |
| 2004/0056736 | A1 | 3/2004 | Enokihara | |
| 2006/0267844 | A1 | 11/2006 | Yanagi et al. | |
| 2017/0331184 | A1 | 11/2017 | Langenberg | |

FOREIGN PATENT DOCUMENTS

| | | | |
|---|---|---|---|
| CN | 207368177 | U | 5/2018 |
| CN | 109088133 | A | 12/2018 |
| CN | 109638457 | A | 4/2019 |
| CN | 109802234 | A | 5/2019 |
| EP | 3671952 | A1 | 6/2020 |

OTHER PUBLICATIONS

Written Opinion for Application No. PCT/CN2019/115384 dated Feb. 12, 2020, 4 pages.

European Search Report for corresponding Application No. 19913459.4 dated Feb. 23, 2022, 11 pages.

European Office Action for corresponding Application No. 19913459.4 dated Sep. 21, 2023, 8 pages.

* cited by examiner

BASE STATION ANTENNA AND PHASE-SHIFTING AND FEEDING DEVICE THEREOF

CROSS REFERENCE TO RELATED APPLICATIONS

This is a U.S. National Stage application of, and claims priority to, PCT/CN2019/115384, filed Nov. 4, 2019, which further claims priority to Chinese Patent Application No. 201910090089.8, filed Jan. 30, 2019, the disclosures of which are incorporated herein by reference in their entirety.

TECHNICAL FIELD

The present disclosure relates to the field of wireless communication technologies, and more particularly, to a base station antenna and a phase-shifting and feeding device thereof.

BACKGROUND

With the development of an antenna technology, miniaturized antennas have become a development trend of base station antennas. A phase-shifting and feeding device is a core element of a base station antenna. After power division and phase shifting by the phase-shifting and feeding device, an electrical signal enters a corresponding antenna channel to realize signal radiation.

At present, the phase-shifting and feeding device is generally formed by two separate components, i.e., a phase shifter and a feeding network board. Moreover, the phase shifter is required to be fed by a feeding circuit of the feeding network board through a feeding cable. Therefore, arrangement of a coaxial cable and joint welding are needed when the phase-shifting and feeding device is processed, which may cause the phase-shifting and feeding device to become larger and heavier, thereby being unfavorable for the miniaturization of the base station antenna.

SUMMARY

In view of the above, there is a need to provide a phase-shifting and feeding device conducive to the miniaturization of the base station antenna with respect to the problem that the existing phase-shifting and feeding device is unfavorable for the miniaturization of the base station antenna.

A phase-shifting and feeding device is provided, including:

- a metal cavity that is a U-shaped groove structure with an opening at one side;
- a phase-shifting circuit mounted in the metal cavity, the phase-shifting circuit having a plurality of signal terminals; and
- a feeding network board including a substrate, a ground plane formed on at least one side of the substrate and a feeding circuit formed on one side of the substrate, the ground plane constituting a base layer for the feeding circuit, and the substrate covering the opening,
- wherein the metal cavity is electrically connected to the ground plane to cooperate with the ground plane to form a shielding cavity for receiving the phase-shifting circuit, and the plurality of signal terminals are electrically connected to the feeding circuit.

In one embodiment, a pin protruding toward the feeding network board is formed at an edge of the opening, the substrate is provided with a metalized slot electrically connected to the ground plane, and the pin is inserted into the metalized slot.

In one embodiment, the metalized slot passes through the substrate, an edge of one side of the metalized slot facing away from the metal cavity is provided with a grounding pad, and one end of the pin protrudes from the metalized slot and is welded to the grounding pad.

In one embodiment, the substrate is provided with a plurality of feeding holes passing through the substrate, an edge of one side of each of the feeding holes facing away from the metal cavity is provided with a feeding pad electrically connected to the feeding circuit, and the signal terminal is electrically connected to the feeding pad through the feeding hole.

In one embodiment, a plurality of legs are formed at positions where the phase-shifting circuit corresponds to the plurality of feeding holes, the plurality of signal terminals are located on the plurality of legs respectively, and the leg is disposed through the feeding hole and welded to the feeding pad.

In one embodiment, the phase-shifting and feeding device further includes a feeding wire disposed through the feeding hole, and the feeding wire has one end welded to the signal terminal and another end welded to the feeding pad.

In one embodiment, a limit cap is formed on one end of the feeding wire, the signal terminal is provided with a through-hole, and the feeding wire is disposed through the through-hole and enables the limit cap to abut against an edge of the through-hole.

In one embodiment, the ground plane is of a monolayer structure and located on one side of the substrate facing the metal cavity, and the feeding circuit is located on one side of the substrate facing away from the metal cavity;

- or the ground plane includes a first metal layer and a second metal layer formed on opposite sides of the substrate, the first metal layer and the second metal layer are electrically connected through a metalized via hole, and the feeding circuit is located on one side of the substrate facing the metal cavity.

In one embodiment, a plurality of metal cavities are provided and cooperate with the ground plane to form a plurality of shielding cavities, and a plurality of phase-shifting circuits are provided and are respectively received in the plurality of shielding cavities.

According to the phase-shifting and feeding device, the metal cavity is a U-shaped groove structure and cooperates with a ground plane to form a shielding cavity, thereby having the effect of the cavity in a conventional phase shifter. Since the ground plane serves as a sidewall of the shielding cavity, one sidewall is omitted from the metal cavity when compared with the cavity of the conventional phase shifter, thereby significantly reducing the thickness and weight of the metal cavity while ensuring the functions of the phase-shifting and feeding device. In addition, the metal cavity and the feeding network board are arranged to be jointly grounded, while a signal terminal is electrically connected to a feeding circuit. Therefore, the feeding circuit may feed the phase-shifting circuit without using a co-axial feeder. Therefore, the described phase-shifting and feeding device has a reduced volume and a simplified structure, thereby facilitating the miniaturization of a base station antenna.

A base station antenna is also provided, including the phase-shifting and feeding device as described in any one of the above preferred embodiments.

DETAILED DESCRIPTION OF THE EMBODIMENTS

Figure 1:
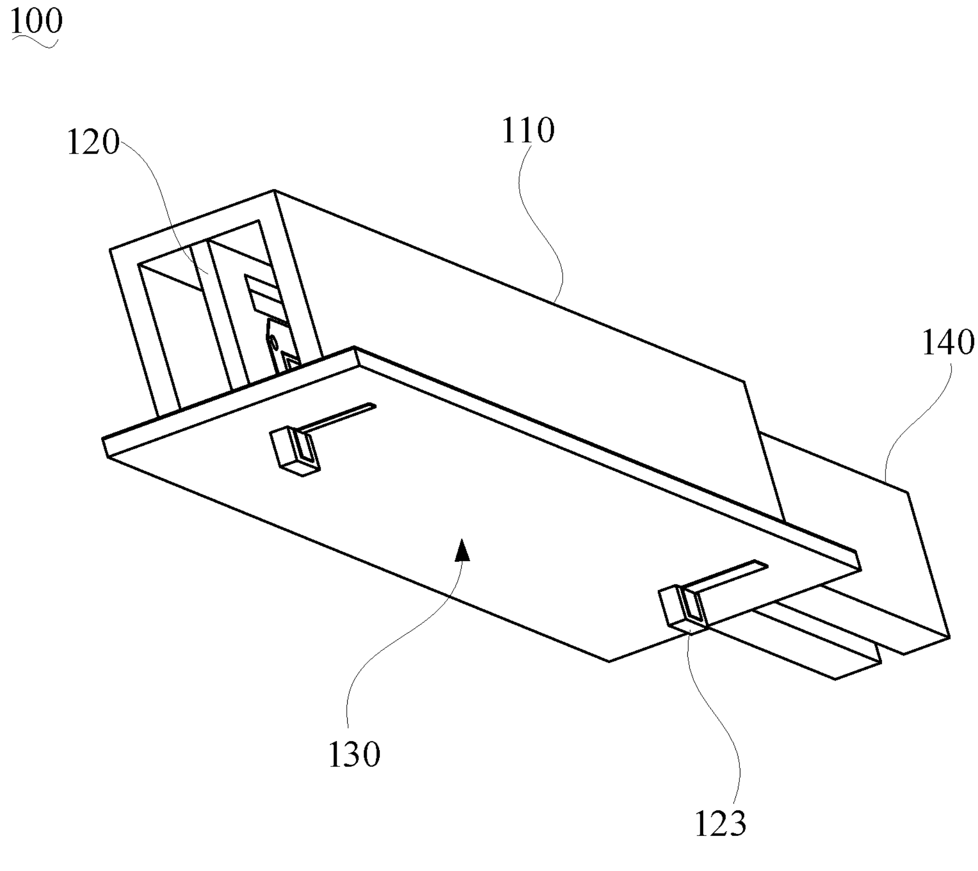
FIG. 1 is a schematic diagram illustrating a configuration of a phase-shifting and feeding device according to a preferred embodiment of the present disclosure.

To facilitate the understanding of the present disclosure, a more comprehensive description of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided to make the contents disclosed in the present disclosure more thoroughly and fully understood.

It is to be noted that when one element is referred to as “fixed to” another element, it may be directly disposed on the other element or an intervening element may be present. When one element is considered to be “connected to” another element, it may be directly connected to the other element or an intervening element may also be present. The terms “vertical”, “horizontal”, “left”, “right” and similar expressions used herein are for illustrative purposes only.

Unless defined otherwise, all technical and scientific terms used herein have the same meanings as would generally understood by those skilled in the technical field of the present disclosure. The terms used herein in the specification of the present disclosure are for the purpose of describing specific embodiments only, and are not intended to limit the present disclosure. The term “and/or” used herein includes any and all combinations of one or more related listed items.

The present disclosure provides a base station antenna and a phase-shifting and feeding device. The base station antenna includes the phase-shifting and feeding device. Moreover, the base station antenna generally further includes a plurality of radiation units, and a plurality of output ports of the phase-shifting and feeding device are communicatively connected to the plurality of radiation units to form a plurality of antenna channels. After electrical signals are power-divided and phase-shifted by the phase-shifting and feeding device, signals of different phases are radiated by the plurality of radiation units respectively.

Figure 2:
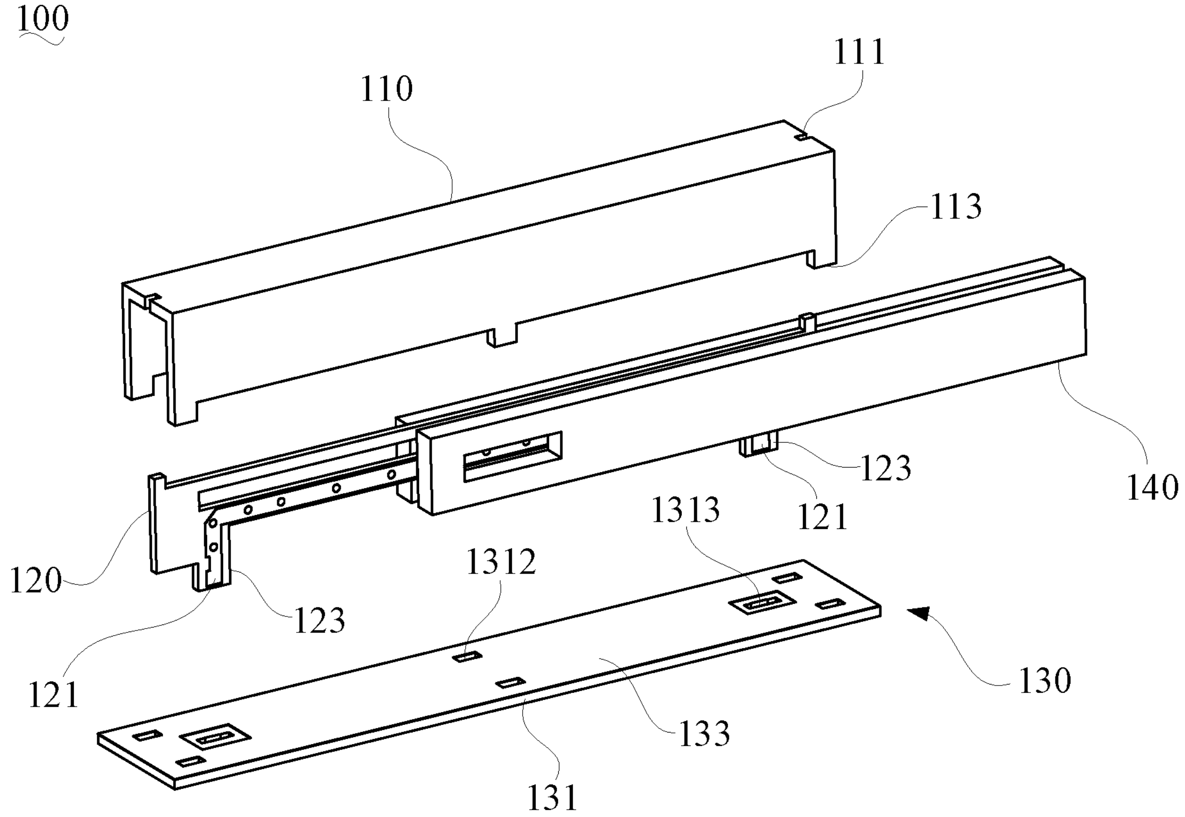
FIG. 2 is a schematic exploded diagram illustrating a configuration of the phase-shifting and feeding device shown in FIG. 1.
Figure 3:
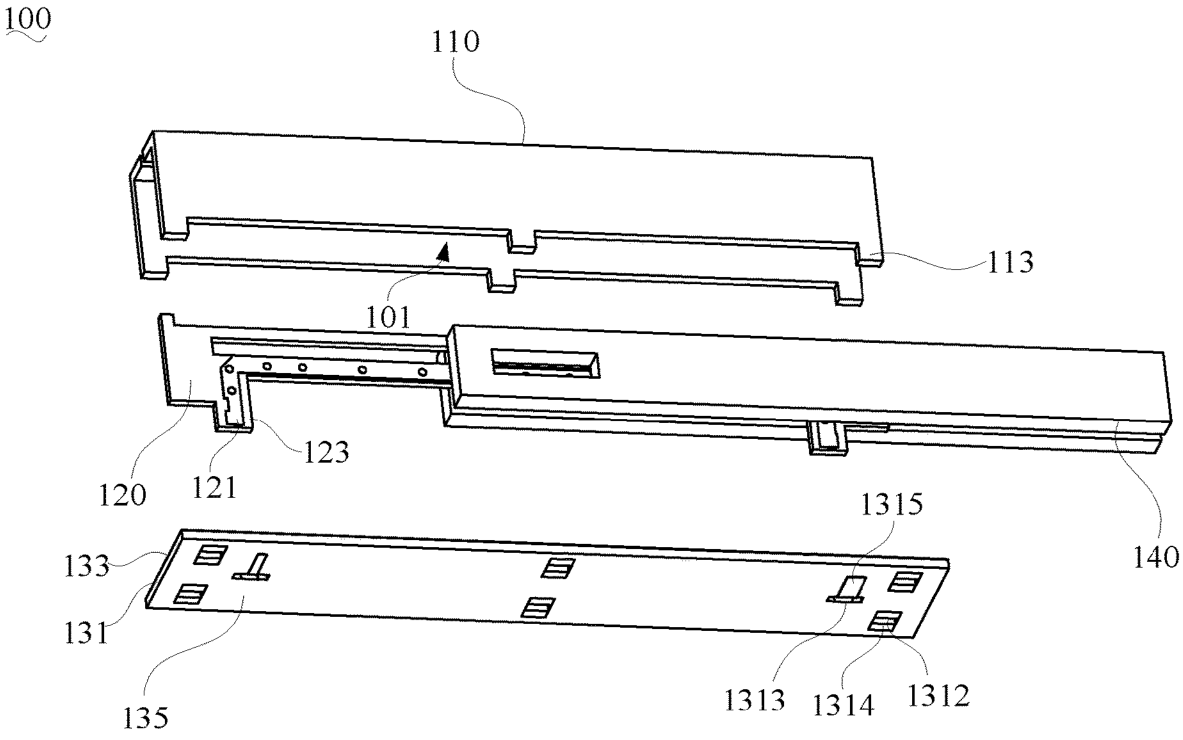
FIG. 3 is a schematic diagram illustrating a configuration of the phase-shifting and feeding device shown in FIG. 2 from another viewing angle.

Referring to FIG. 1, FIG. 2 and FIG. 3, a phase-shifting and feeding device 100 according to a preferred embodiment of the present disclosure includes a metal cavity 110, a phase-shifting circuit 120, and a feeding network board 130.

The metal cavity 110 is a U-shaped groove structure with an opening at one side. The metal cavity 110 is generally elongated, with its opening 101 also extending along its length direction. Specifically, the U-shaped groove structure means that a cross section of the metal cavity 110 is U-shaped. The metal cavity 110 may be enclosed by a bottom wall and two sidewalls extending along two sides of the bottom wall and arranged oppositely or enclosed by only one arc-shaped sidewall. Therefore, one sidewall is omitted from the metal cavity 110 when compared with the cavity of the conventional phase shifter, and thus its thickness and weight may be reduced significantly.

The phase-shifting circuit 120 is mounted in the metal cavity 110. The phase-shifting circuit 120 has a plurality of signal terminals 121. The signal terminal 121 is configured to input and output an electrical signal. The number of the signal terminal 121 may be correspondingly adjusted according to different application scenarios. The phase-shifting circuit 120 may be in a circuit form of a PCB board structure, a metal stereostructure, a strip line structure, a microstrip line structure or the like.

Specifically, in this embodiment, the phase-shifting circuit 120 may be in a circuit form of a PCB board structure or a metal stereostructure manufactured by an existing process. Moreover, in order to facilitate the mounting and fixing of the phase-shifting circuit 120, the sidewall of the metal cavity 110 is provided with a fixed slot 111 to clamp the phase-shifting circuit 120, which may play a good role in positioning the phase-shifting circuit 120. The phase-shifting circuit 120 may be inserted from the opening of the metal cavity 110 into the fixed slot 111 in the metal cavity 110, which greatly improves the mounting convenience of the phase-shifting circuit 120 compared with the cavity of the conventional phase shifter.

The phase-shifting circuit 120 has a main function of realizing a phase change of the electrical signal. According to a principle of phase shift, a dielectric sliding phase shifter or a conductor sliding phase shifter may be provided. Since the dielectric sliding phase shifter has the advantages of a compact structure and small intermodulation interference, phase shift is realized also using dielectric sliding in this embodiment. Therefore, the phase-shifting and feeding device 100 further includes a phase-shifting dielectric plate 140. The phase-shifting dielectric plate 140 is slidably received in the metal cavity 110 and is arranged oppositely to the phase-shifting circuit 120. An electrical length in the phase-shifting circuit 120 can be changed by sliding the phase-shifting dielectric plate 140, so that each signal terminal 121 can output a varying phase.

The feeding network board 130 includes a substrate 131, a ground plane 133 and a feeding circuit 135. The substrate 131 is generally formed of a material with a high dielectric constant. The ground plane 133 may be a metal layer formed on a surface of the substrate 131 by coating, printing or the like. The feeding circuit 135 may be of a strip line or microstrip line structure or of a PCB circuit structure integrated with the substrate 131. The feeding circuit 135 is generally formed by a power division circuit and a filter circuit.

The ground plane 133 is formed on at least one side of the substrate 131. The feeding circuit 135 is formed on either side of the substrate 131. Moreover, the ground plane 133 is insulated from the feeding circuit 135, and the ground plane 133 constitutes a base layer for the feeding circuit 135. That is, at least part of the ground plane 133 and the feeding circuit 135 are located on opposite sides of the substrate 131.

The substrate 131 covers the opening 101 of the metal cavity 110, and the metal cavity 110 forms an electrical connection with the ground plane 133. Therefore, the metal cavity 110 cooperates with the ground plane 133 to form a shielding cavity (not indicated in the figure). The shielding cavity is a closed structure, which is equivalent to the cavity of the conventional phase shifter, configured to receive the phase-shifting circuit 120. The phase-shifting circuit 120 cooperates with the shielding cavity to form a phase shifter module, so as to realize a function of a phase shifter. Therefore, the functions of the phase-shifting and feeding device 100 are not affected without significantly reducing the thickness and the weight of the metal cavity 110.

It is to be noted that each feeding network board 130 may correspond to a plurality of phase shifter modules according to an integration complexity difference of the base station antenna. Specifically, in this embodiment, a plurality of metal cavities 110 are provided and cooperate with the ground plane 133 to form a plurality of shielding cavities, and a plurality of phase-shifting circuits 120 are provided and are respectively received in the plurality of shielding cavities. That is, a plurality of phase-shifting circuits 120 and a plurality of metal cavities 110 are integrated on one feeding network board 130. One phase-shifting circuit 120 and one metal cavity 110 form a pair of phase shifter modules, and a mounting relationship between each phase shifter module and the feeding network board 130 is the same.

Referring to FIG. 2 and FIG. 3 again, specifically, in this embodiment, the ground plane 133 is of a monolayer structure and located on one side of the substrate 131 facing the metal cavity 110, and the feeding circuit 135 is located on one side of the substrate 131 facing away from the metal cavity 110.

In this case, the ground plane 133 is distributed on only one side of the substrate 131, and the ground plane 133 and the feeding circuit 135 are respectively located on opposite sides of the substrate 131. The ground plane 133 constitutes a base layer for the feeding circuit 135 and can also serve as a sidewall of the shielding cavity. Therefore, the feeding network board 130 has fewer circuit layers and a more compact structure, which helps further reduce the volume of the phase-shifting and feeding device 100.

The substrate 131 may be fixed to the metal cavity 110 by welding, clamping or the like, so that the feeding network board 130 can be integrated with the phase-shifting circuit 120 and the metal cavity 110. Specifically, in this embodiment, a pin 113 protruding toward the feeding network board 130 is formed at an edge of the opening 101, the substrate 131 is provided with a metalized slot 1312 electrically connected to the ground plane 133, and the pin 113 is inserted into the metalized slot 1312.

The pin 113 and the metal cavity 110 are of an integrated-formed structure, and the pin 113 cooperates with the metalized slot 1312 to realize fast positioning. Moreover, easy insertion of the pin 113 into the metalized slot 1312 can quickly realize the assembly of the metal cavity 110 and the substrate 131. In addition, an inner wall of the metalized slot 1312 is metalized, so a contact area between the ground plane 133 and the pin 113 can be increased, thereby improving the reliability of the electrical connection between the metal cavity 110 and the ground plane 133.

Further, in this embodiment, the metalized slot 1312 passes through the substrate 131, and an edge of one side of the metalized slot 1312 facing away from the metal cavity 110 is provided with a grounding pad 1314. One end of the pin 113 protrudes from the metalized slot 1312 and is welded to the grounding pad 1314.

Specifically, the grounding pad 1314 and the ground plane 133 may be integrated. The reliability of the electrical connection between the metal cavity 110 and the ground plane 133 may be further improved by welding the pin 113 to the grounding pad 1314. Moreover, since the metalized slot 1312 passes through the substrate 131, the welding operation may be performed on one side of the substrate 131 facing away from the metal cavity 110. In this case, the metal cavity 110 and the phase-shifting circuit 120 form position avoidance for a welded portion, so as to facilitate the operation.

In addition, the plurality of signal terminals 121 are electrically connected to the feeding circuit 135. Therefore, an electrical signal may be transmitted between the feeding circuit 135 and the phase-shifting circuit 120. Since the metal cavity 110 and the feeding network board 130 are arranged to be jointly grounded, while the signal terminal 121 is electrically connected to the feeding circuit 135, it plays a role of a conventional co-axial feeder. Therefore, in the phase-shifting and feeding device 100, the feeding circuit 135 may feed the phase-shifting circuit 120 without using a co-axial feeder.

Compared with an existing phase shifter, the electrical connection between the phase-shifting circuit 120 and the feeding circuit 135 can be realized without using a co-axial feeder. Therefore, a wiring slot of the co-axial feeder is not required to be arranged on an outer wall of the metal cavity 110, and common problems of low welding efficiency and poor welding quality caused by the welding of the co-axial feeder to the wiring slot on the outer wall of the metal cavity 110 are prevented, which helps improve the electrical performance of the phase-shifting and feeding device 100.

The signal terminal 121 and the feeding circuit 135 can be electrically connected by welding, wire connection, or plugging. In this embodiment, the substrate 131 is provided with a plurality of feeding holes 1313 passing through the substrate 131, an edge of one side of each of the feeding holes 1313 facing away from the metal cavity 110 is provided with a feeding pad 1315 electrically connected to the feeding circuit 135, and the signal terminal 121 is electrically connected to the feeding pad 1315 through the feeding hole 1313.

Specifically, the signal terminal 121 may be led to one side of the substrate 131 facing away from the metal cavity 110 through the feeding hole 1313. The feeding hole 1313 may be a metalized via hole or an ordinary through-hole according to a different requirement. In this case, no matter how the signal terminal 121 is electrically connected to the feeding pad 1315, the operation is convenient since the metal cavity 110 and the phase-shifting circuit 120 can form position avoidance for an electrically connected portion.

Further, in this embodiment, a plurality of legs 123 are formed at positions where the phase-shifting circuit 120 corresponds to the plurality of feeding holes 1313, the plurality of signal terminals 121 are located on the plurality of legs 123 respectively, and the leg 123 is disposed through the feeding hole 1313 and welded to the feeding pad 1315.

Specifically, the leg 123 is integrally formed with the phase-shifting circuit 120, for example, an extended projection at an edge of a PCB board. The leg 123 cooperates with the feeding hole 1313 to realize the fast positioning of the signal terminal 121 and the feeding circuit 135. Moreover, the signal terminal 121 is led out through the leg 123, so only one welding operation is needed at the feeding pad 1315, thereby reducing a number of welding. In addition, due to a limiting effect of the feeding hole 1313, the leg 123 is not easy to fall off, which can also improve the reliability of the electrical connection between the phase-shifting circuit 120 and the feeding circuit 135.

Figure 4:
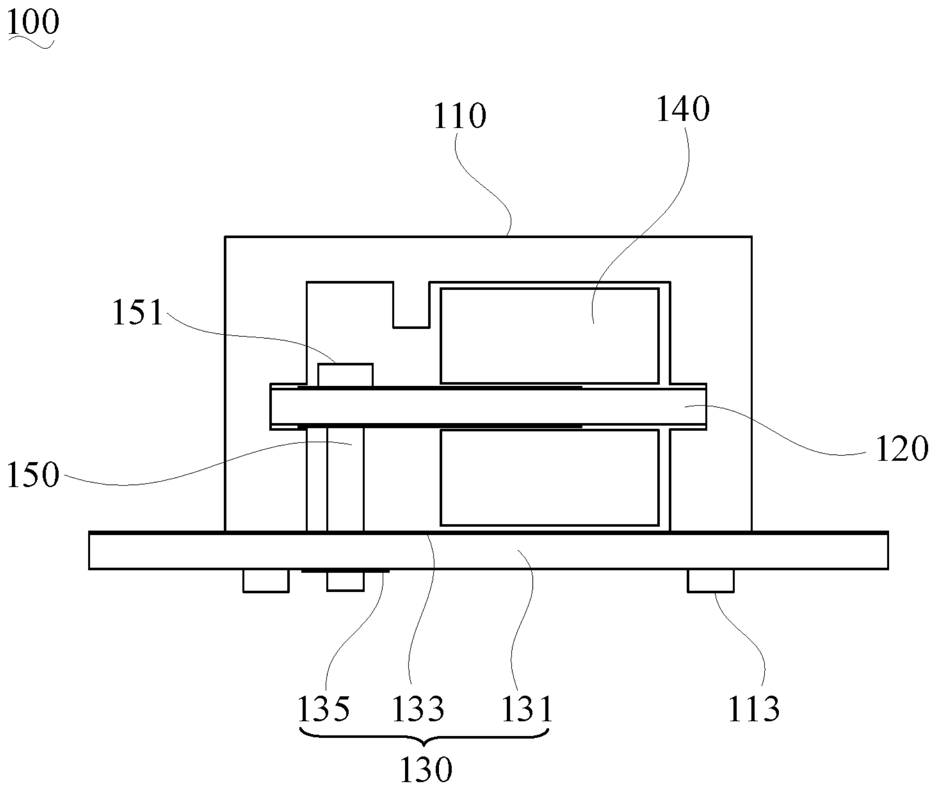
FIG. 4 is a cross-sectional view of a phase-shifting and feeding device according to a second embodiment.

It is to be noted that the phase-shifting circuit 120 and the feeding circuit 135 may also be electrically connected in other manners. For example, in the phase-shifting and feeding device 100 according to a second embodiment shown in FIG. 4, the phase-shifting circuit 120 and the feeding circuit 135 are connected using a feeding wire 150.

In the second embodiment, the phase-shifting and feeding device 100 is different from the phase-shifting and feeding device 100 according to the preferred embodiment of the present disclosure in that the phase-shifting and feeding device 100 further includes a feeding wire 150 disposed through the feeding hole 1313. The feeding wire 150 has one end welded to the signal terminal 121 and another end welded to the feeding pad 1315.

Specifically, the feeding wire 150 may be a metal conductor bar, a metal conductor strip or a PCB circuit board. The feeding wire 150 may be bent and twisted when passing through the feeding hole 1313. Therefore, even if the plurality of signal terminals 121 are not one-to-one aligned with the plurality of feeding holes 1313, the electrical connection can be finally smoothly realized through the feeding wire 150. That is, the above electrical connection manner has relatively low requirements on the assembly accuracy of the phase-shifting circuit 120 and the opening accuracy of the substrate 131, which helps improve a product yield.

Further, in this embodiment, a limit cap 151 is formed on one end of the feeding wire 150, the signal terminal 121 is provided with a through-hole (not shown in the figure), and the feeding wire 150 is disposed through the through-hole and enables the limit cap 151 to abut against an edge of the through-hole.

The limit cap 151 has a large diameter so that a longitudinal section of the feeding wire 150 is T-shaped. When the feeding wire 150 is welded, one end away from the limit cap 151 may be first inserted into the through-hole of the signal terminal 121, and the feeding wire 150 may be prevented from slipping out by the limit cap 151, so as to facilitate the assembly.

Figure 5:
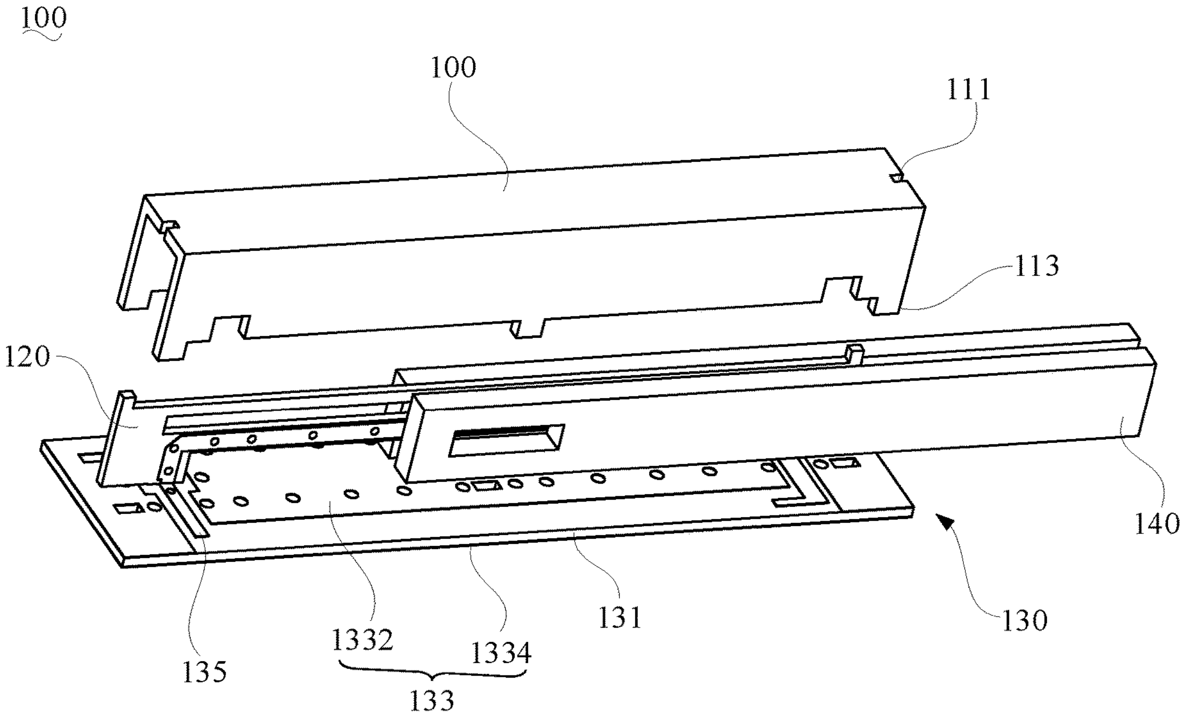
FIG. 5 is a schematic exploded diagram illustrating a configuration of a phase-shifting and feeding device according to a third embodiment.
Figure 6:
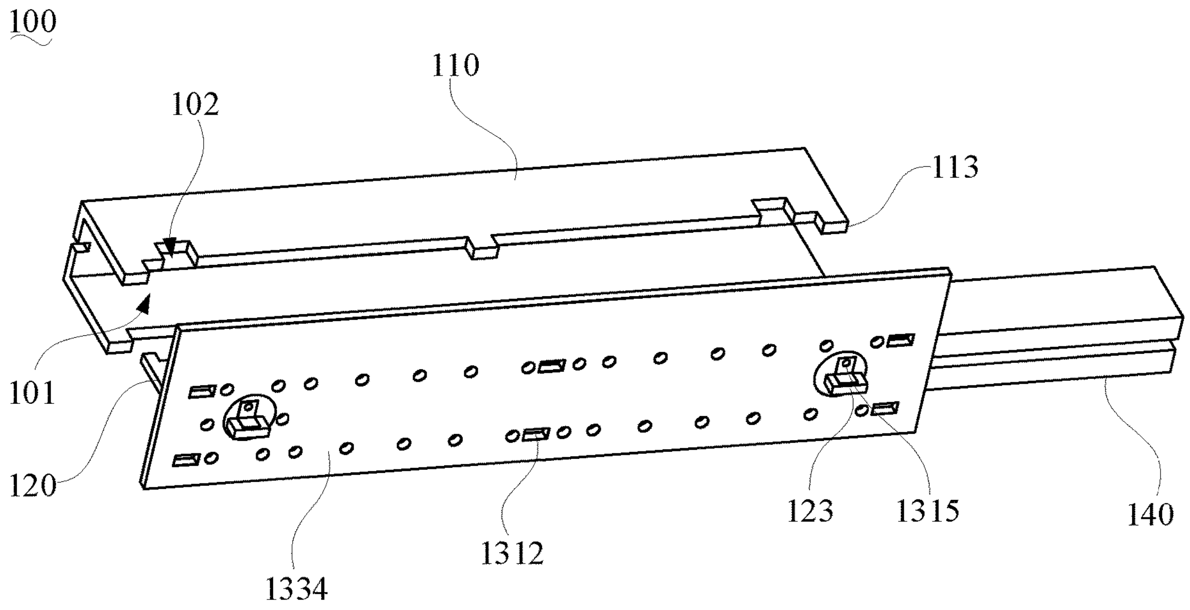
FIG. 6 is a schematic diagram illustrating a configuration of the phase-shifting and feeding device shown in FIG. 5 from another viewing angle.

Referring to FIG. 5 and FIG. 6, the phase-shifting and feeding device 100 according to a third embodiment of the present disclosure is different from the phase-shifting and feeding device 100 according to the preferred embodiment of the present disclosure in that: the ground plane 133 includes a first metal layer 1332 and a second metal layer 1334 formed on opposite sides of the substrate, the first metal layer 1332 and the second metal layer 1334 are electrically connected through a metalized via hole 1336, and the feeding circuit 135 is located on one side of the substrate 131 facing the metal cavity 110.

In this case, the feeding circuit 135 and the phase-shifting circuit 120 are located on a same side of the substrate 131. The ground plane 133 is of a double-layer structure. The first metal layer 1332 serves as a sidewall of the shielding cavity. The second metal layer 1334 constitutes a base layer for the feeding circuit 135.

The first metal layer 1332 and the feeding circuit 135 are located on the same side of the substrate 131, but they are insulated from each other. Specifically, the first metal layer 1332 is partially hollowed out, and the feeding circuit 135 is formed within a hollow region. Therefore, a gap is formed between the feeding circuit 135 and the first metal layer 1332 to realize insulation. Moreover, the second metal layer 1334 is of an entire-surface plate structure, so the hollow region of the first metal layer 1332 can be shielded to enable improved sealing of the shielding cavity, so as to improve a shielding effect.

Moreover, in order to realize position avoidance for the feeding circuit 135, the edge of the opening 101 of the metal cavity 110 is also provided with a position avoiding notch 102.

It will be understood that, on the basis of the second embodiment, the electrical connection between the phase-shifting circuit 120 and the feeding circuit 135 in the third embodiment may be changed to a connection through the feeding wire 150.

In the phase-shifting and feeding device 100, the metal cavity 110 is a U-shaped groove structure which cooperates with a ground plane 133 to form a shielding cavity, thereby having the effect of the cavity in a conventional phase shifter. Since the ground plane 133 serves as a sidewall of the shielding cavity, one sidewall is omitted from the metal cavity 110 when compared with the cavity of the conventional phase shifter, thereby significantly reducing the thickness and weight of the metal cavity 110 while ensuring the functions of the phase-shifting and feeding device 100. In addition, the metal cavity 110 and the feeding network board 130 are arranged to be jointly grounded, while the signal terminal 121 is electrically connected to the feeding circuit 135. Therefore, the feeding circuit 135 may feed the phase-shifting circuit 120 without using a co-axial feeder. Therefore, the described phase-shifting and feeding device 100 has a reduced volume and a simplified structure, thereby facilitating the miniaturization of a base station antenna.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

The invention claimed is:

1. A phase-shifting and feeding device, comprising:

a metal cavity that is a U-shaped groove structure with an opening at one side;

a phase-shifting circuit mounted in the metal cavity, the phase-shifting circuit having signal terminals; and a feeding network board that includes a substrate having a first side facing the metal cavity and a second side facing away from the metal cavity, a ground plane formed on at least one of the first and second sides of the substrate and a feeding circuit formed on one of the first and second sides of the substrate, the ground plane forming a base layer for the feeding circuit, and the substrate covering the opening, wherein the metal cavity is electrically connected to the ground plane to cooperate with the ground plane to form a shielding cavity for receiving the phase-shifting circuit, and the signal terminals are electrically connected to the feeding circuit, and a pin protruding toward the feeding network board is formed at an edge of the opening, the substrate is provided with a metalized slot electrically connected to the ground plane, and the pin is adapted to be inserted into the metalized slot.

2. The phase-shifting and feeding device according to claim 1, wherein the metalized slot passes through the substrate, an edge of one side of the metalized slot facing away from the metal cavity is provided with a grounding pad, and one end of the pin protrudes from the metalized slot and is welded to the grounding pad.

3. The phase-shifting and feeding device according to claim 1, wherein the substrate includes feeding holes passing through the substrate, an edge of one side of each of the feeding holes facing away from the metal cavity is provided with a feeding pad electrically connected to the feeding circuit such that the feeding holes are respectively provided with feeding pads, and the signal terminals are electrically connected to the feeding pads through the feeding holes.

4. The phase-shifting and feeding device according to claim 3, wherein legs are formed at positions where the phase-shifting circuit corresponds to the feeding holes, the signal terminals are located on the legs respectively, and the legs are respectively disposed through the feeding holes and welded to the feeding pads.

5. The phase-shifting and feeding device according to claim 3, further comprising feeding wires respectively disposed through the feeding holes, wherein the feeding wires respectively have first and second ends, and the first wire ends are respectively welded to the signal terminals and the second wire ends are respectively welded to the feeding pads.

6. The phase-shifting and feeding device according to claim 5, wherein limit caps are respectively formed on the first ends of the feeding wires, the signal terminals are respectively provided with a through-hole, and the feeding wires are respectively disposed through the through-holes and respectively enable the limit caps to abut against respective edges of the through-holes.

7. The phase-shifting and feeding device according to claim 1, wherein the ground plane is of a monolayer structure and is located on the first side of the substrate, and the feeding circuit is located on the second side of the substrate;

or the ground plane includes a first metal layer formed on the first side of the substrate and a second metal layer formed on the second side of the substrate, the first metal layer and the second metal layer are electrically connected through a metalized via hole, the feeding circuit is located on the first side of the substrate, and the second metal layer constitutes the base layer for the feeding circuit.

8. The phase-shifting and feeding device according to claim 1, further comprising metal cavities that cooperate with the ground plane to form shielding cavities, and phase-shifting circuits are provided and are respectively received in the shielding cavities.

9. A base station antenna, comprising the phase-shifting and feeding device according to claim 1.

10. The phase-shifting and feeding device according to claim 1, wherein the ground plane is insulated from the feeding circuit.

11. A phase-shifting and feeding device, comprising:

a metal cavity that is a U-shaped groove structure with an opening at one side;

a phase-shifting circuit mounted in the metal cavity, the phase-shifting circuit having signal terminals; and a feeding network board that includes a substrate having a first side facing the metal cavity and a second side facing away from the metal cavity, a ground plane formed on at least one of the first and second sides of the substrate and a feeding circuit formed on one of the first and second sides of the substrate, the ground plane forming a base layer for the feeding circuit, and the substrate covering the opening, wherein the metal cavity is electrically connected to the ground plane to cooperate with the ground plane to form a shielding cavity for receiving the phase-shifting circuit, and the signal terminals are electrically connected to the feeding circuit, wherein the substrate includes feeding holes passing through the substrate, an edge of one side of each of the feeding holes facing away from the metal cavity is provided with a feeding pad electrically connected to the feeding circuit such that the feeding holes are respectively provided with feeding pads, and the signal terminals are electrically connected to the feeding pads through the feeding holes, and wherein the phase-shifting and feeding device further comprises feeding wires respectively disposed through the feeding holes, the feeding wires respectively have first and second wire ends, and the first wire ends are respectively welded to the signal terminals and the second wire ends are respectively welded to the feeding pads.

12. The phase-shifting and feeding device according to claim 11, wherein a pin protruding toward the feeding network board is formed at an edge of the opening, the substrate is provided with a metalized slot electrically connected to the ground plane, and the pin is adapted to be inserted into the metalized slot.

13. The phase-shifting and feeding device according to claim 12, wherein the metalized slot passes through the substrate, an edge of one side of the metalized slot facing away from the metal cavity is provided with a grounding pad, and one end of the pin protrudes from the metalized slot and is welded to the grounding pad.

14. The phase-shifting and feeding device according to claim 11, wherein legs are formed at positions where the phase-shifting circuit corresponds to the feeding holes, the signal terminals are located on the legs respectively, and the legs are respectively disposed through the feeding holes and welded to the feeding pads.

15. The phase-shifting and feeding device according to claim 11, wherein limit caps are respectively formed on the first ends of the feeding wires, the signal terminals are respectively provided with a through-hole, and the feeding wires are respectively disposed through the through-holes and respectively enable the limit caps to abut against respective edges of the through-holes.

16. The phase-shifting and feeding device according to claim 11, wherein the ground plane is of a monolayer structure and is located on the first side of the substrate, and the feeding circuit is located on the second side of the substrate; or the ground plane includes a first metal layer formed on the first side of the substrate and a second metal layer formed on the second side of the substrate, the first metal layer and the second metal layer are electrically connected through a metalized via hole, the feeding circuit is located on the first side of the substrate, and the second metal layer constitutes the base layer for the feeding circuit.

17. The phase-shifting and feeding device according to claim 11, further comprising metal cavities that cooperate with the ground plane to form shielding cavities, and phase-shifting circuits are provided and are respectively received in the shielding cavities.

18. A phase-shifting and feeding device, comprising:

a metal cavity that is a U-shaped groove structure with an opening at one side;

a phase-shifting circuit mounted in the metal cavity, the phase-shifting circuit having signal terminals; and a feeding network board that includes a substrate having a first side facing the metal cavity and a second side facing away from the metal cavity, a ground plane formed on at least one of the first and second sides of the substrate and a feeding circuit formed on one of the first and second sides of the substrate, the ground plane forming a base layer for the feeding circuit, and the substrate covering the opening, wherein the metal cavity is electrically connected to the ground plane to cooperate with the ground plane to form a shielding cavity for receiving the phase-shifting circuit, and the signal terminals are electrically connected to the feeding circuit, and wherein the ground plane is insulated from the feeding circuit.

* * * * *